Patented Jan. 8, 1952

2,581,841

UNITED STATES PATENT OFFICE 2,581,841

INSECT REPELLENT

Nathan L. Drake, College Heights, Md., and Charles M. Eaker, Affton, Mo., assignors to the United States of America as represented by the Secretary of the Army No Drawing. Application January 11, 1949, Serial No. 70,394

9 Claims. (Cl. 167—30)

This invention relates to insect repellents.

We have found that the application of 1,4-cyclohexanediol monopropionate, a compound having the structural formula

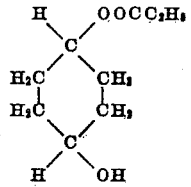

to the human skin or to a fabric affords effective protection against insect bites, by repelling insects, particularly *Aedes aegypti* and *Anopheles quadrimaculatus*.

A number of tests to measure the repellency of 1,4-cyclohexanediol monopropionate against *Aedes aegypti* was conducted by smearing the compound on the arms of test personnel, who then thrust their arms into cages containing *Aedes aegypti*. The arms were exposed for 30-minute intervals at 3 minutes each until the first insect bite.

Tests to measure the repellency of 1,4-cyclohexanediol monopropionate impregnated fabrics against *Aedes aegypti* were conducted by uniformly impregnating mercerized cotton hose with the compound at a rate equivalent to 3.3 gms. per sq. ft., drawing the dried hose over the arms of test personnel, who then thrust their covered arms into cages containing *Aedes aegypti* for 1 to 2 minutes. If no bites or less than 5 bites were received, the tests were repeated each successive day until 5 or more bites during one exposure were received.

It was found that the application of 1,4-cyclohexanediol monopropionate affords protection against *Aedes aegypti* for an average of 311 minutes. Against *Anopheles quadrimaculatus*, an average repellency time of 46 minutes was noted in analogous tests.

It was found that fabric impregnated with 1,4-cyclohexanediol monopropionate remained repellent for over 10 successive days.

Surprisingly, it was found that the corresponding diester, 1,4-cyclohexanediol dipropionate, lacks insect repellency if applied to the skin, and upon application to a fabric repels insects for only a fraction of the time for which the monoester protects.

1,4-cyclohexanediol monopropionate may be made, for instance, by conversion of the corresponding diester, as follows:

150 g. 1,4-cyclohexanediol dipropionate are dissolved in 1050 ml. of 50% ethanol at 40–50°. 33 gms. of potassium hydroxide in 150 cc. of 5% ethanol are added. The mixture is shaken vigorously for 5 minutes and then the alcohol is removed under reduced pressure. The residue is cooled until the diester crystallizes. The diester is collected on a cold filter and the filtrate saved. The diester is put back into the flask and heated with 400 ml. water until the solid melts. The mixture is cooled and the diester again removed. This is repeated at least once more. The aqueous filtrate is extracted four times with a 200 ml. portion of chloroform. The chloroform is dried over $MgSO_4$, filtered and distilled. The monoester distills at 90–92°/0.5 mm. The yield is 48 g., 37% of theory; its refractive index is $n_D^{24}=1.4615$.

For ease of application to the skin, the 1,4-cyclohexanediol monopropionate may be incorporated in a suitable inert liquid or solid carrier such as mineral oil, alcohol, petrolatum, etc. For ease and uniformity of application to the fabric, the 1,4-cyclohexanediol monopropionate may be applied to the fabric in an inert solvent, such as alcohol, ether, etc.

Having thus described our invention, we claim:

1. An insect-repellent fabric comprising fabric impregnated with 1,4-cyclohexanediol monopropionate.

2. An insect repellent composition comprising 1,4-cyclohexanediol monopropionate in a non-gaseous inert organic carrier.

3. An insect repellent composition containing as an essential active ingredient 1,4-cyclohexanediol monopropionate, and a non-toxic insect-repellent-adjuvant as a carrier therefor.

4. An insect-repellent composition comprising 1,4-cyclohexanediol monopropionate in alcohol.

5. An insect-repellent composition comprising 1,4-cyclohexanediol monopropionate in ether.

6. An insect-repellent composition comprising 1,4-cyclohexanediol monopropionate in oil.

7. An insect-repellent composition comprising 1,4-cyclohexanediol monopropionate in petrolatum.

8. A process of repelling insects comprising applying 1,4-cyclohexanediol monopropionate to the region from which the insects are to be repelled.

9. A process of repelling insects comprising applying 1,4-cyclohexanediol monopropionate to the skin.

NATHAN L. DRAKE.
CHARLES M. EAKER.

(References on following page)

REFERENCES CITED

The following references are of record in the file of this patent:

UNITED STATES PATENTS

| Number | Name | Date |
|---|---|---|
| 2,400,006 | Jones et al. | May 7, 1946 |

OTHER REFERENCES

O. S. R. D., Insect Control Committee Report No. 28, Interim Report No. O-94, page 39, May 18, 1945.

Palfray: Comp. rend. 189, 188–189 (1929).

Aldersley: Jour. Chem. Soc., London, 1940, 10–16.

Dimroth: Berichte 75B, 317–321 (1942).